United States Patent
Kumar et al.

(10) Patent No.: US 11,849,181 B2
(45) Date of Patent: *Dec. 19, 2023

(54) SYSTEMS AND METHODS FOR APPLYING BEHAVIORAL-BASED PARENTAL CONTROLS FOR MEDIA ASSETS

(71) Applicant: Rovi Guides, Inc., San Jose, CA (US)

(72) Inventors: Vijay Kumar, Karnataka (IN); Rajendran Pichaimurthy, Karnataka (IN); Madhusudhan Srinivasan, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,708

(22) Filed: Dec. 21, 2022

(65) Prior Publication Data

US 2023/0188787 A1 Jun. 15, 2023

Related U.S. Application Data

(63) Continuation of application No. 17/515,927, filed on Nov. 1, 2021, now Pat. No. 11,564,010, which is a continuation of application No. 16/520,282, filed on Jul. 23, 2019, now Pat. No. 11,190,840.

(51) Int. Cl.
*H04N 21/454* (2011.01)
*H04N 21/442* (2011.01)
*H04N 21/422* (2011.01)
*G10L 15/18* (2013.01)
*G10L 15/08* (2006.01)

(52) U.S. Cl.
CPC ....... *H04N 21/454* (2013.01); *G10L 15/1822* (2013.01); *H04N 21/42203* (2013.01); *H04N 21/44218* (2013.01); *H04N 21/44222* (2013.01); *G10L 2015/088* (2013.01)

(58) Field of Classification Search
CPC .......... H04N 21/454; H04N 21/42203; H04N 21/44222; H04N 21/44218; G10L 15/1822; G10L 2015/088
See application file for complete search history.

(56) References Cited

U.S. PATENT DOCUMENTS

| | | | |
|---|---|---|---|
| 5,758,257 A | 5/1998 | Herz et al. | |
| 6,091,886 A | 7/2000 | Abecassis | |
| 8,858,312 B1 | 10/2014 | Ward et al. | |
| 10,070,154 B2* | 9/2018 | Holzer | H04N 21/23418 |
| 10,425,247 B2 | 9/2019 | Roe et al. | |
| 10,863,210 B2* | 12/2020 | Holzer | H04N 21/2187 |
| 11,190,840 B2 | 11/2021 | Kumar et al. | |
| 2008/0261696 A1 | 10/2008 | Yamazaki et al. | |
| 2009/0202114 A1* | 8/2009 | Morin | A63F 13/12 |
| | | | 382/118 |

(Continued)

*Primary Examiner* — An Son P Huynh
(74) *Attorney, Agent, or Firm* — Haley Guiliano LLP

(57) ABSTRACT

Systems and methods are disclosed herein for applying behavioral-based parental controls for media assets. The disclosed techniques herein discuss determining a media asset viewed by a user and character actions of a character within the media asset. Behavioral user data is received which includes a user action. A determination is made whether the user action matches one of the character actions. If a match is found, a parental control restriction setting for the media asset is applied and this parental control restriction is stored in memory.

16 Claims, 10 Drawing Sheets

(56) References Cited

U.S. PATENT DOCUMENTS

| | | | |
|---|---|---|---|
| 2012/0090000 A1* | 4/2012 | Cohen | H04N 21/8355 725/32 |
| 2012/0159530 A1* | 6/2012 | Ahrens | H04N 21/45457 725/32 |
| 2013/0283401 A1* | 10/2013 | Pabla | G06F 21/554 726/30 |
| 2015/0030314 A1* | 1/2015 | Skarakis | G06V 40/23 386/278 |
| 2015/0067708 A1 | 3/2015 | Jensen et al. | |
| 2015/0070516 A1* | 3/2015 | Shoemake | H04N 21/4542 348/207.11 |
| 2015/0286716 A1 | 10/2015 | Snibbe et al. | |
| 2016/0021412 A1* | 1/2016 | Zito, Jr. | G06Q 30/02 725/13 |
| 2016/0027260 A1 | 1/2016 | Pierce et al. | |
| 2016/0037217 A1* | 2/2016 | Harmon | H04N 21/4542 725/9 |
| 2016/0057497 A1* | 2/2016 | Kim | H04N 21/4415 725/10 |
| 2016/0150278 A1* | 5/2016 | Greene | H04N 21/4542 725/28 |
| 2017/0149795 A1* | 5/2017 | Day, II | H04W 4/02 |
| 2017/0280208 A1 | 9/2017 | Mishra et al. | |
| 2018/0352302 A1 | 12/2018 | Roe et al. | |
| 2019/0258667 A1 | 8/2019 | Mccarty et al. | |
| 2019/0281366 A1 | 9/2019 | Henderson | |
| 2020/0059703 A1* | 2/2020 | Sonare | H04N 21/23418 |
| 2020/0077150 A1* | 3/2020 | Fox | H04N 21/45455 |
| 2021/0029406 A1 | 1/2021 | Kumar et al. | |
| 2022/0060786 A1 | 2/2022 | Kumar et al. | |

\* cited by examiner

300

400

SYSTEMS AND METHODS FOR APPLYING BEHAVIORAL-BASED PARENTAL CONTROLS FOR MEDIA ASSETS

CROSS-REFERENCE TO RELATED APPLICATIONS

This application is a continuation application of U.S. patent application Ser. No. 17/515,927, filed Nov. 1, 2021, which is a continuation of U.S. patent application Ser. No. 16/520,282, filed Jul. 23, 2019, now U.S. Pat. No. 11,190,840, the disclosure of which is hereby incorporated by reference herein in their entireties.

BACKGROUND

The present disclosure is directed to techniques for application of parental controls, more particularly, applying behavioral-based parental controls for media assets.

SUMMARY

Electronic devices commonly allow for users to enter parental control restrictions for media assets by manually entering parental control restrictions through a user interface. Even though media assets may have designated content ratings, such as the Motion Picture Association of America ("MPAA") film rating system, parents may still wish to further implement custom parental control restrictions based on observed adverse behavior of their child in reaction to specific media assets. This technique of manual entry lacks the ability to integrate observed data of the child as feedback to apply parental control restrictions for creating or changing restrictions of specific media assets.

Accordingly, techniques are disclosed herein for applying behavioral-based parental controls for media assets. The disclosed techniques herein discuss determining a media asset viewed by a user, and character actions within the media asset. Behavioral user data is received which includes a user action. A determination is made whether the user action matches one of the character actions. If a match is found, a parental control restriction setting for the media asset is applied and this parental control restriction is stored in memory.

In some variants, the disclosed techniques utilize a user baseline behavior dataset to determine deviations of the user's behavior from the baseline. Specifically, the technique receives a recording of the user (e.g. the recording may be received via an electronic device, such as a video camera). A determination of baseline user actions is made based on the recording. The technique generates a user baseline behavior dataset based on the baseline user actions. In some variants, the technique determines whether a user action matches an abnormal behavior model. If so, the matching user action is excluded from the plurality of baseline user actions to be used in generating the user baseline behavior dataset.

Various techniques are disclosed herein to determine whether the user action matches the character actions. One disclosed technique receives a voice input of the user and parses the voice input into keywords. The technique determines whether the keywords match keywords associated with the character within the media asset. A similar embodiment exists for matching non-lexical utterances. Another disclosed technique receives a video segment of the user and parses the video segment into video actions. The technique determines whether a video action matches an action associated with the character within the media asset.

In some embodiments, a determination is made whether the character appears in additional media assets other than the media asset. In response to a positive determination, an additional parental control restriction setting for the additional media assets is applied, and this additional parental control restriction is stored in memory.

The techniques disclosed herein may be used as means to efficiently implement parental control restrictions based on matching behavioral user actions to character actions in media assets. For example, a behavior analysis engine may analyze the actions of a user and determine a match to a character action of a media asset viewed by the user. The behavior analysis engine, without human intervention, automatically applies the parental control restriction via control circuitry and stores this restriction in memory (e.g. at the server of a streaming service, or a local streaming managing device).

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
FIG. 1A shows an illustrative diagram of a user viewing a media asset, in accordance with some embodiments of the disclosure.

FIG. 1A shows an illustrative diagram 100 of a user viewing a media asset, in accordance with some embodiments of the disclosure. In this example, the viewer 102 is watching a media asset 104 Peppa Pig® on a television screen. During the playback of the media asset, a character George screams "Oink" 106. In some embodiments, a streaming service is used to playback the media asset. A behavior analysis engine may interface with the streaming service to determine which media asset is being viewed. The behavior analysis engine may also determine the specific user viewing the media asset using various techniques such as receiving user login information and/or session profile information for the streaming service. Another technique involves determining the user via image recognition based on a camera device interfacing with the behavior analysis engine. In another variant, the behavior analysis engine may determine the user based on the specific device identification used to operate the streaming service (e.g. a user's smartphone hardware identification number).

The behavior analysis engine may determine actions of the character within the media asset. Techniques, such as retrieving time-based metadata, closed captioning information, narration information, or similar information types may be implemented to determine the actions within the media asset. This information may be searched to determine specific actions of a character. In another technique, the behavior analysis engine may apply the media asset to a parsing engine which utilizes pattern and image recognition the characters, actions, settings, and other audio and visual information within the media asset. Continuing from the example above, the behavior analysis engine may receive time-based metadata of the particular episode of Peppa Pig® being viewed by the user and retrieving a transcript of all dialogue within the episode (including non-lexical utterances such as signs, excited cheers, and other types of utterances).

The behavior analysis engine may receive behavioral user data of the user including a user action. One technique for receiving behavioral user data of the user includes receiving a recording of the user. Specifically, the behavior analysis engine may receive a recording of the user via an electronic device over a communications network (e.g. Internet, Bluetooth, NFC, or similar network). The electronic device may be an optical recording device such as a camera, whether it be embedded or stand-alone. The electronic device may be an audio-based recording device such as a voice recorder whether embedded or stand-alone. The recording may be periodic or initiated once the media asset on the streaming service is initiated. In certain instances, the electronic device may be smart-glasses, smartwatches, smart-home assistants, or similar devices. In this technique, the behavior analysis engine interfaces with the streaming service to receive information of when the media asset is selected for viewing. The behavior analysis engine may determine, based on the recording, a plurality of baseline user actions. The behavior analysis engine may use image recognition techniques to detect gestures, motions, audibles, eye-movement, and other visual cues to determine specific user actions. The behavior analysis engine may generate a user baseline behavior dataset based on the plurality of baseline user actions. Continuing from the above example, if a six-year-old child is watching Peppa Pig®, the behavior analysis engine may interface with an embedded camera and microphone within a Smart television. The camera and microphone may determine that the six-year-old is sitting and watching the episode of Peppa Pig® in silence for the majority of the duration, and other actions (e.g. adjusting feet, changing posture, scratching face, and rubbing hair). This set of actions may be used as a baseline behavior dataset for the six-year-old. In some embodiments, the user action may include information related to social media posts, instant messages, or other forms of electronic messaging by the user (e.g. a tweet by a user constitutes a user action).

In some embodiments, the behavior analysis engine may determine an action matches an abnormal behavior model. If the action matches an abnormal behavior model, the behavior analysis engine may exclude that action from the baseline behavior dataset. The term "matching," used throughout the specification, may include an equivalency in value or may include a number of values which constitute a match within a specified threshold. The abnormal behavior model may be a default model used by the behavior analysis engine (e.g. any loud dialogue above 90 decibels and/or rapid limb movement for excess of two seconds). There may be specific abnormal behavior model templates for specific types of users (e.g. child model, teenager model, adult model). For example, the camera and microphone may determine that the six-year-old shrieks and jumps up and down in reaction to a spider crawling across the floor within close proximity of the six-year-old. The behavior analysis engine compares the action to a received child model. The user action of shrieking and jumping up and down is not within the child model, and thus the behavior analysis engine excludes the user action from the baseline behavior dataset for the six-year-old.

Figure 1B:
FIG. 1B shows an illustrative diagram of an electronic device capturing a user action, in accordance with some embodiments of the disclosure.

The behavior analysis engine may determine whether a user action matches a character action. In one technique to determine matching, the behavior analysis engine receives a voice input of the user. The voice input may be sent digitally through a communication network to the behavior analysis engine in a specific digital format (e.g. encoded and compressed such as .mp3 format, uncompressed, or other known format). The behavior analysis engine may parse the voice input into one or more keywords. Parsing digital voice data into one or more keywords may be implemented by various techniques known to one of ordinary skill in the art. The behavior analysis engine may determine whether the one or more keywords derived from the parsing, matches one or more keywords associated with the character within the media asset. FIG. 1B shows an illustrative diagram 111 of an electronic device capturing a user action, in accordance with some embodiments of the disclosure. The six-year-old screams "Oink!" 112 at her mother 114 which is captured by a home security camera with embedded microphone 116. Continuing from the above example, the user action of screaming "Oink!" is captured by the microphone and digitally parsed to determine a keyword "Oink" which is sent to the behavior analysis engine. The behavior analysis engine has previously determined that the character George screams "Oink!" using time-based metadata. The behavior analysis engine determines that there is a match between the user action (e.g. keyword Oink spoken by the six-year-old) and the keyword from the media asset (e.g. Oink spoken by George).

In some embodiments, the behavior analysis engine parses the voice input into one or more non-lexical utterances. Parsing digital voice data into one or more non-lexical utterances may be implemented by various techniques known to one of ordinary skill in the art. The behavior analysis engine may determine whether the non-lexical utterances matches one or more non-lexical utterances associated with the character within the media asset.

In another technique to determine whether a user action matches a character action, the behavior analysis engine receives a video segment of the user. The video segment may be sent digitally through a communication network to the behavior analysis engine in a specific digital format (e.g. encoded and compressed such as .mp4 format, uncompressed, or other known format). The behavior analysis engine may parse the video segment input into one or more video actions. Parsing digital video segments into one or more video actions may be implemented by various techniques known to one of ordinary skill in the art. The behavior analysis engine may determine whether the one or more video actions matches one or more actions associated with the character within the media asset. Continuing from the above example, the user action of screaming "Oink!" is captured by the embedded camera and microphone in a video segment. The behavior analysis engine may digitally parse the video segment into to a video action screaming "Oink" which is sent to the behavior analysis engine. The behavior analysis engine has previously determined that the character George screams "Oink!" using time-based metadata. The behavior analysis engine determines that there is a match between the video action (e.g. six-year-old screaming Oink) and the action associated with character from the media asset (e.g. action of George screaming Oink).

Figure 1C:
FIG. 1C shows an illustrative diagram of a user watching a different media asset after a parent control restriction was applied to the media asset, in accordance with some embodiments of the disclosure.

Upon a positive match between the user action and the keyword from the media asset, the behavior analysis engine applies the parental control restriction setting for the media asset, and stores in memory the parental control restriction. A parental control restriction may include any of a variety of restrictions such as excluding the entire episode from viewing, excluding the entire series from viewing, excluding a scene from an episode from viewing, dubbing replacement audio for a scene for viewing, and/or inserting a replacement scene. Storing in memory may include the behavior analysis engine storing an instruction in local volatile memory (e.g. RAM) to be sent to a streaming service. In other embodiments, storing in memory may include generating an instruction to be sent to a streaming service to implement on their servers and/or databases. Continuing from the above example, a restriction would be put on the specific episode of Peppa Pig® by removing the specific episode of Peppa Pig® from eligible viewing for the six-year old. This restriction is stored as a user preference by the streaming service in memory. FIG. 1C shows an illustrative diagram 121 of a user watching a different media asset after a parent control restriction was applied to the media asset, in accordance with some embodiments of the disclosure. The user (e.g. six-year-old) 102 is now watching a new media asset Sesame Street® 123, as the previous media asset Peppa Pig® has a parental control restriction placed on it which is stored by the streaming service to prevent the user from viewing the specific episode of Peppa Pig®.

In some embodiments, the behavior analysis engine determines whether the character appears in one or more additional media assets other than the media asset. In response to a positive determination, the behavior analysis engine applies an additional parental control restriction setting for the additional media assets and stores the additional parental control restriction in memory. For example, if the initial parental control restriction was to restrict viewing of a single episode of Peppa Pig® due to the character George, the behavior analysis engine would determine if George from Peppa Pig® appears in any other episodes of Peppa Pig® or other media assets. In this case, George appears in every Peppa Pig® episode, and thus an additional parental control restriction restricts viewing of every Peppa Pig® episode and stores this additional restriction for the user profile in the streaming service server in memory.

Figure 2:
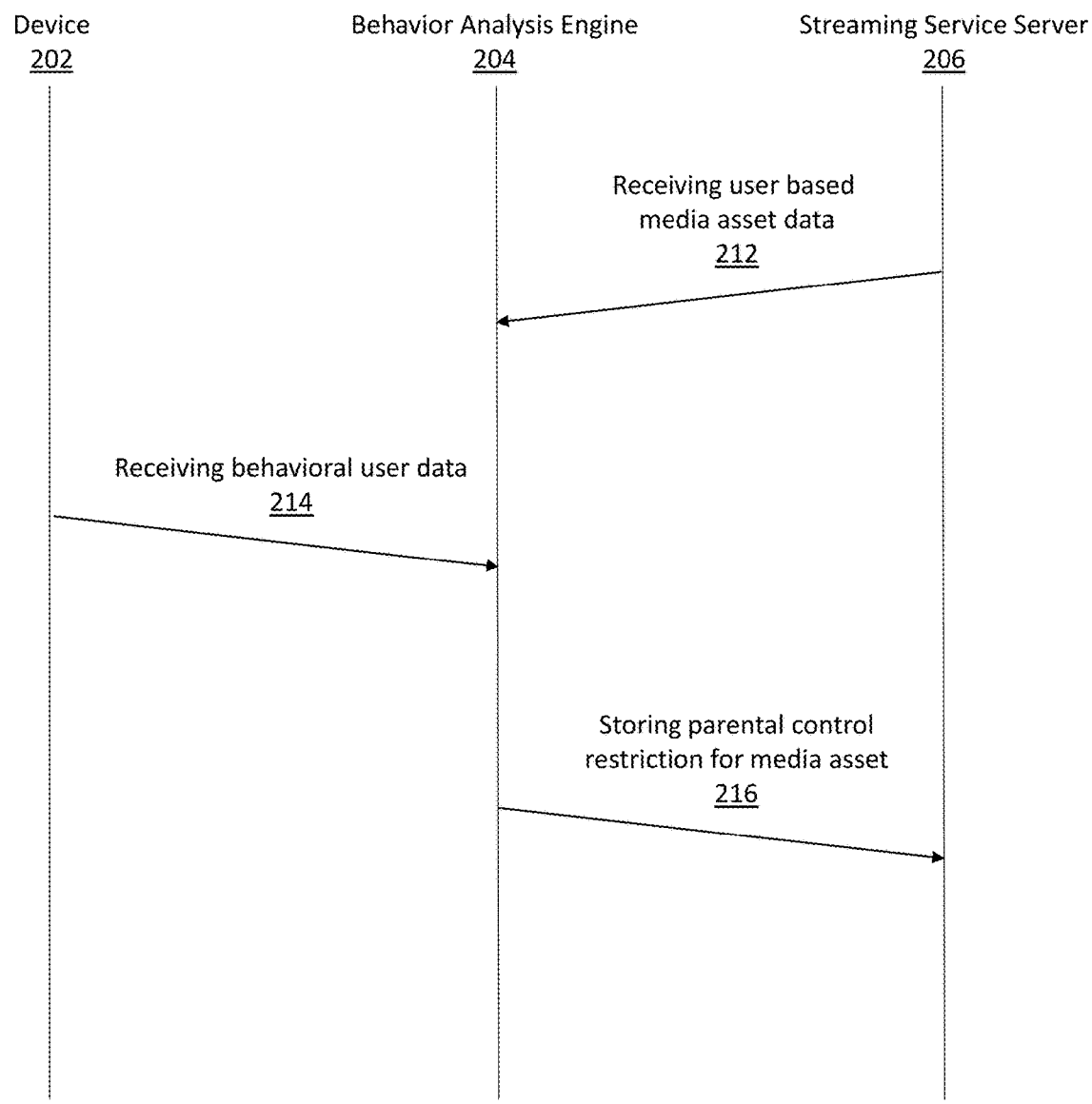
FIG. 2 shows an illustrative data flow diagram including a device, a behavior analysis engine, and a streaming service server, in accordance with some embodiments of the disclosure.

FIG. 2 shows an illustrative data flow diagram 200 including a device, a behavior analysis engine, and a streaming service server, in accordance with some embodiments of the disclosure. The behavior analysis engine 204 receives user-based media asset data 212 from a streaming service server 206 (e.g. the specific media asset the user is viewing). The behavior analysis engine determines character actions of a character within the media asset. The behavior analysis engine receives behavioral user data 214 from the device 202 (e.g. a camera capturing user actions). The behavior analysis engine determines whether the user action matches one of the character actions from the media asset. In response to a match, the behavior analysis engine applies the parental control restriction and stores the restriction for the media asset 216 and sends this instruction to the streaming service server.

Figure 3:
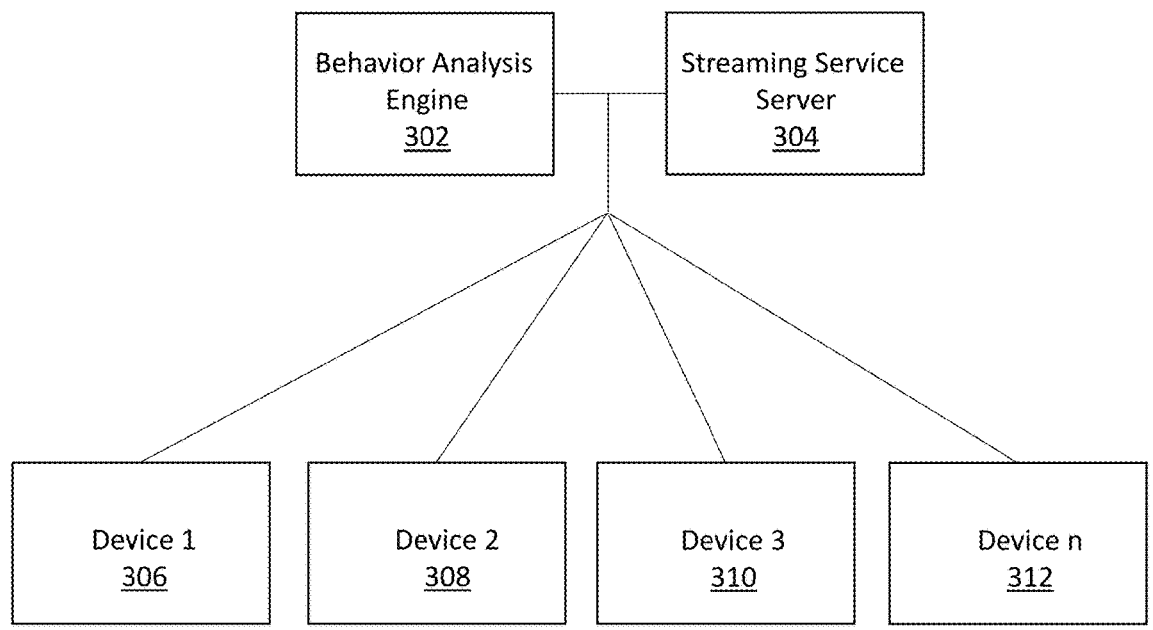
FIG. 3 shows an illustrative system diagram of the behavior analysis engine, streaming service server, and multiple electronic devices, in accordance with some embodiments of the disclosure.
Figure 4:
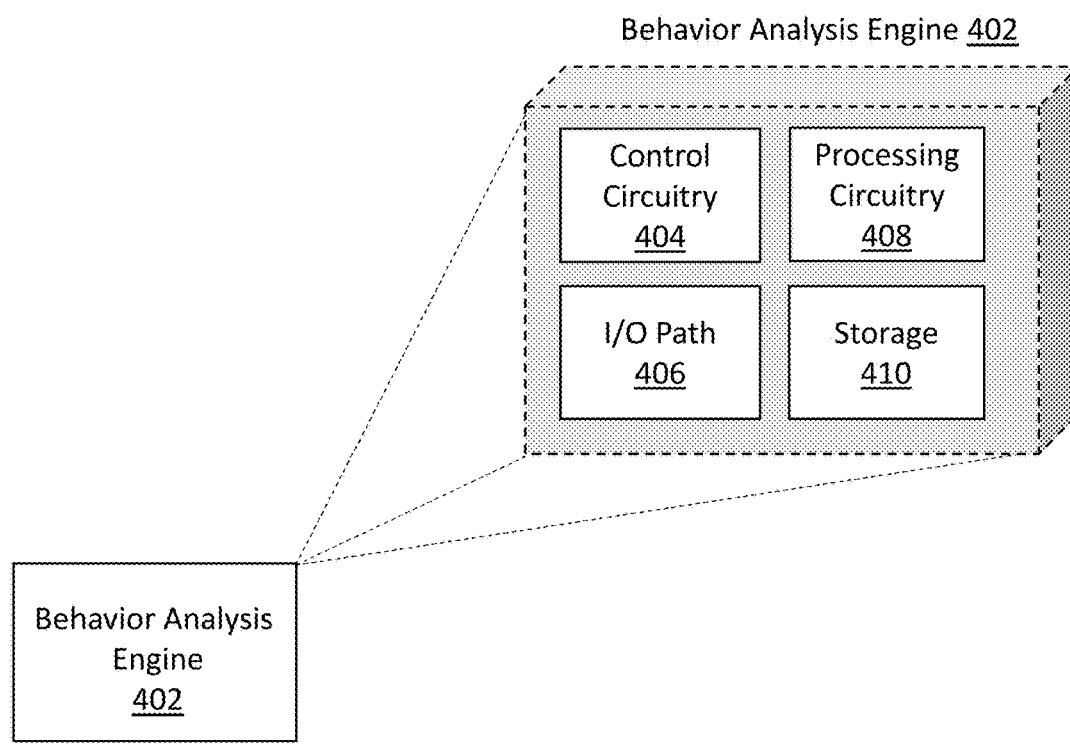
FIG. 4 shows an illustrative block diagram of the behavior analysis engine, in accordance with some embodiments of the disclosure.

FIG. 3 shows an illustrative system diagram 300 of the behavior analysis engine, streaming service server, and multiple electronic devices, in accordance with some embodiments of the disclosure. The behavior analysis engine 302 may be of any hardware that provides for processing and transmit/receive functionality. The linguistics processing engine may be communicatively coupled to multiple electronic devices (e.g. device 1 (306), device 2 (308), device 3 (310), and device n (312)), and a streaming service server 304. As illustrated within FIG. 3, a further detailed disclosure on the behavior analysis engine can be seen in FIG. 4 showing an illustrative block diagram of the behavior analysis engine, in accordance with some embodiments of the disclosure.

In some embodiments, the behavior analysis engine may be implemented remote from the devices 306-312 such as from a cloud server configuration. The behavior analysis engine may be any device for retrieving information from the devices 306-312 and identifying and/or parsing voice/video and other information from media content streaming from the streaming service server 304. The behavior analysis engine may be implemented by a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a smart-home personal assistant, a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, Internet-of-Things device, wearable device, or wireless device, and/or combination of the same. Any of the system modules (e.g., behavior analysis engine, streaming service server, and electronic devices) may be any combination of shared or disparate hardware pieces that are communicatively coupled.

In some embodiments, the streaming service server may be implemented remote from the electronic devices 306-312 and the behavior analysis engine 302 such as a cloud server configuration. The streaming service server may be any device interfacing with the behavior analysis engine for provision of media assets. In some embodiments, the streaming service server provides the media assets via streaming format over a communication network (e.g., Internet, Bluetooth, NFC, or similar). In some embodiments, the streaming service server provides permissions for a user account to access media assets on local storage. The streaming service server may be implemented by remote servers, remote databases, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, Internet-of-Things device, wearable device, or wireless device, and/or combination of the same.

In some embodiments, the behavior analysis engine, streaming service server, and a device from devices 306-312 may be implemented within a single local device. In other embodiments, the behavior analysis engine and streaming service server may be implemented within a single local device.

The electronic devices (e.g. device 1 (306), device 2 (308), device 3 (310), and device n (312)), may be any device that has properties to transmit/receive network data as well as an interface to record the user through audio/video means. The devices 306-312 may be implemented by a camera, video camera, microphone, television, a Smart TV, a set-top box, an integrated receiver decoder (IRD) for handling satellite television, a digital storage device, a digital media receiver (DMR), a digital media adapter (DMA), a streaming media device, a personal computer (PC), a laptop computer, a tablet computer, a WebTV box, a personal computer television (PC/TV), a PC media server, a PC media center, a handheld computer, a stationary telephone, a mobile telephone, a portable video player, a portable music player, a portable gaming machine, a smart phone, or any other television equipment, computing equipment, Internet-of-Things device, wearable device, or wireless device, and/or combination of the same.

FIG. 4 shows an illustrative block diagram 400 of the behavior analysis engine, in accordance with some embodiments of the disclosure. In some embodiments, the behavior analysis engine may be communicatively connected to a user interface. In some embodiments, the behavior analysis engine may include processing circuitry, control circuitry, and storage (e.g. RAM, ROM, hard disk, removable disk, etc.). The behavior analysis engine may include an input/output path 406. I/O path 406 may provide device information, or other data, over a local area network (LAN) or wide area network (WAN), and/or other content and data to control circuitry 404, that includes processing circuitry 408 and storage 410. Control circuitry 404 may be used to send and receive commands, requests, signals (digital and analog), and other suitable data using I/O path 406. I/O path 406 may connect control circuitry 404 (and specifically processing circuitry 408) to one or more communications paths.

Control circuitry 404 may be based on any suitable processing circuitry such as processing circuitry 408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g. dual-core, quad-core, hexa-core, or any suitable number of cores) or super-computer. In some embodiments, processing circuitry may be distributed across multiple separate processors or processing units, for example, multiple of the same type of processing units (e.g. two Intel Core i7 processors) or multiple different processors (e.g. an Intel Core i5 processor and an Intel Core i7 processor). In some embodiments, control circuitry 404 executes instructions for a behavior analysis engine stored in memory (e.g. storage 410).

Memory may be an electronic storage device provided as storage 410, which is part of control circuitry 404. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The behavior analysis engine 402 may be coupled to a communications network. The communication network may be one or more networks including the Internet, a mobile phone network, mobile voice or data network (e.g. a 5G, 4G or LTE network), mesh network, peer-to-peer network, cable network, or other types of communications network or combinations of communications networks. The behavior analysis engine may be coupled to a secondary communication network (e.g. Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g. for broadcast or other wireless signals), or any other suitable wired or wireless communications path or combination of such paths.

Figure 5:
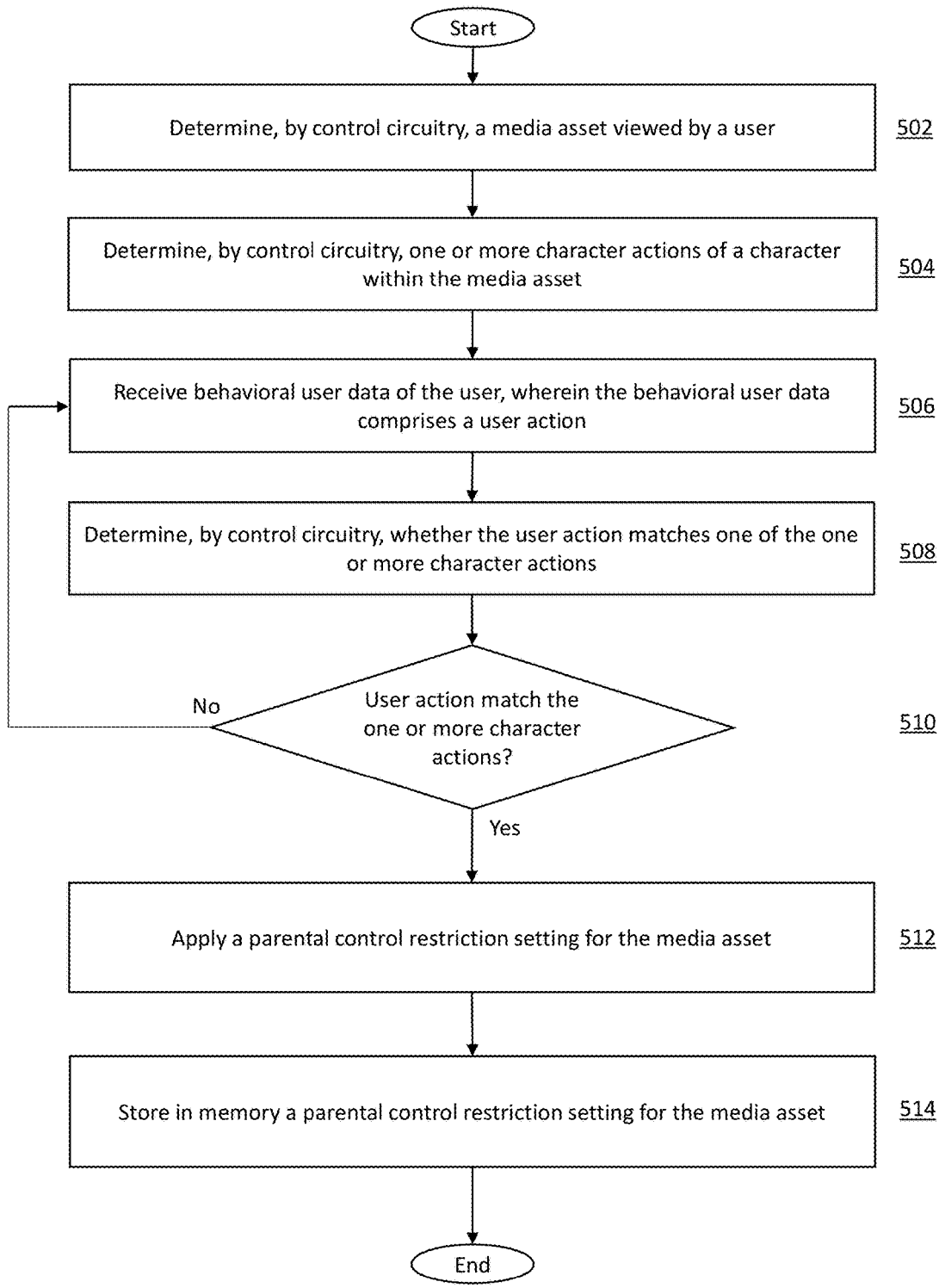
FIG. 5 is an illustrative flowchart of a process for applying behavioral-based parental controls for media assets, in accordance with some embodiments of the disclosure.

FIG. 5 is an illustrative flowchart of a process 500 for applying behavioral-based parental controls for media assets, in accordance with some embodiments of the disclosure. Process 500, and any of the following processes, may be executed by control circuitry 404 (e.g. in a manner instructed to control circuitry 404 by the behavior analysis engine 402 and/or streaming service server 412). Control circuitry 404 may be part of a behavior analysis engine, or of a remote server separated from the behavior analysis engine by way of a communication network, or distributed over a combination of both.

At 502, the behavior analysis engine 302, by control circuitry 404, determines a media asset viewed by a user. In some embodiments, the behavior analysis engine receives information from the streaming service server 304 via the I/O path 406 regarding the media asset viewed by the user. In some embodiments, determining of the media asset viewed by the user is performed, at least in part, by processing circuitry 408.

At 504, the behavior analysis engine 302, by control circuitry 404, determines one or more character actions of a character within the media asset. In some embodiments, the determining of the one or more character actions of a character within the media asset requires parsing techniques performed, at least in part, by processing circuitry 408. In other embodiments, the determining of the one or more character actions of a character within the media asset requires retrieval of metadata of the media asset from the streaming service server 304 via the I/O path 406.

At 506, the behavior analysis engine 302, by control circuitry 404, receives behavioral user data of the user, wherein the behavioral user data comprises a user action. In some embodiments, the behavior analysis engine 302 receives data from devices 306-312 via the I/O path 406, where the devices provide recorded data of the user.

At 508, the behavior analysis engine 302, by control circuitry 404, determines whether the user action matches one of the one or more character actions. In some embodiments, determining whether the user action matches one of the one or more character actions is performed, at least in part, by processing circuitry 408. If, at 510, control circuitry determines "No," the user action does not match one of the one or more character actions, the process reverts to 506.

If, at 510, control circuitry determines "Yes," the user action matches one of the one or more character actions, the process advances to 512. At 512, the behavior analysis engine 302, by control circuitry 404, applies a parental control restriction setting for the media asset and stores in memory the parental control restriction 514. In some embodiments, the behavior analysis applies a parental control restriction setting via an instruction to the streaming service server 304 via the I/O path 406. In some embodiments, the behavior analysis stores in memory the parental control restriction by transmitting an instruction to the streaming service server 304 via the I/O path 406.

Figure 6:
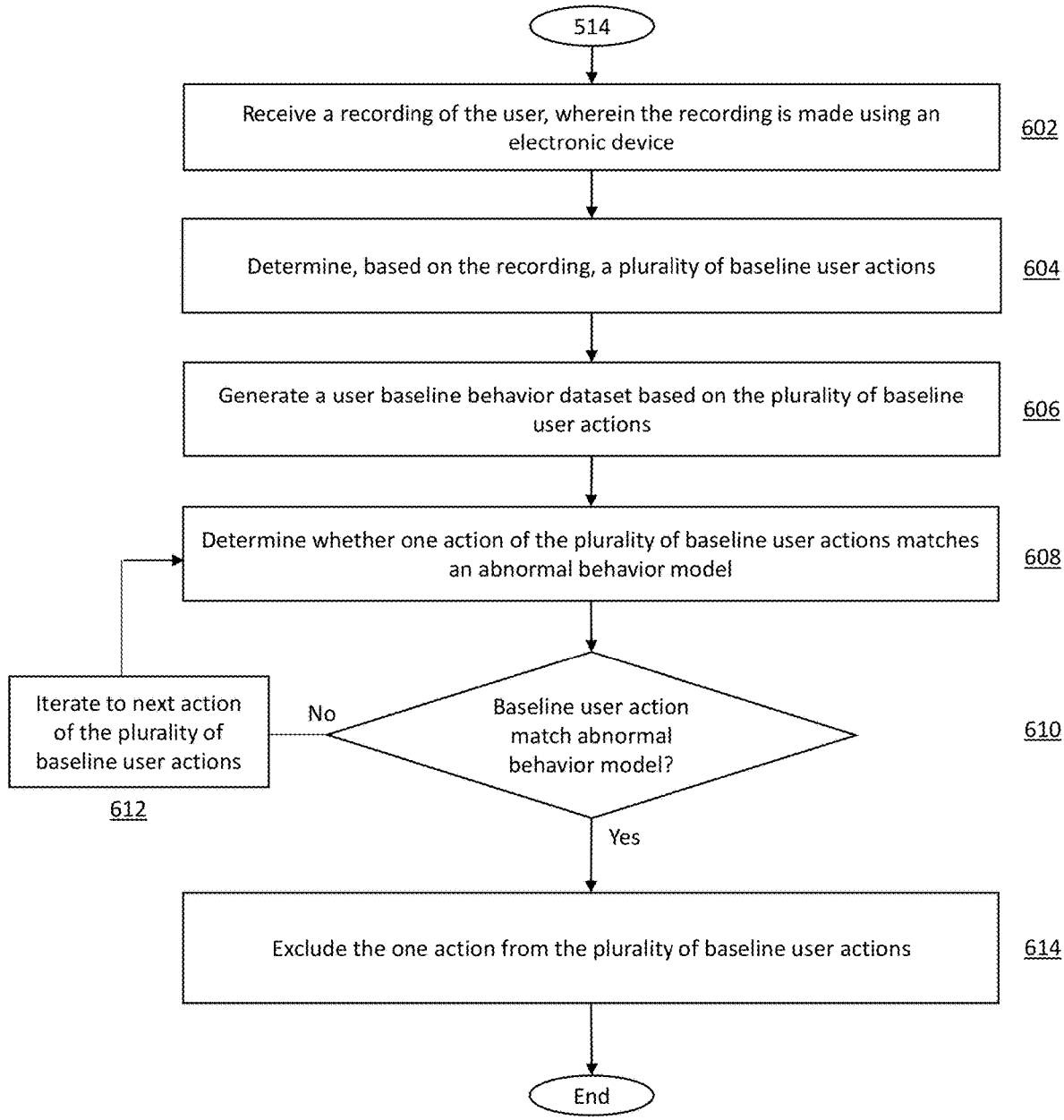
FIG. 6 is an illustrative flowchart of a process for generating a user baseline behavior dataset, in accordance with some embodiments of the disclosure.

FIG. 6 is an illustrative flowchart of a process 600 for generating a user baseline behavior dataset, in accordance with some embodiments of the disclosure. At 602, the linguistics processing engine 302, by control circuitry 404, receives a recording of the user, wherein the recording is made using an electronic device. In some embodiments, the behavior analysis engine 302 receives data from devices 306-312 via the I/O path 406, where the devices provide recorded data of the user.

At 604, the behavior analysis engine 302, by control circuitry 404, determines, based on the recording, a plurality of baseline user actions. In some embodiments, the determining of the plurality of baseline user actions requires parsing techniques of the recording performed, at least in part, by processing circuitry 408.

At 606, the behavior analysis engine 302, by control circuitry 404, generates a user baseline behavior dataset based on the plurality of baseline user actions. In some embodiments, the baseline behavior dataset is generated, at least in part, by processing circuitry 408.

At 608, the behavior analysis engine 302, by control circuitry 404, determines whether one action of the plurality of baseline user actions matches an abnormal behavior model. In some embodiments, the behavior analysis engine 302 may receive an abnormal behavior model from devices 306-312 or streaming service server 304 via the I/O path 406. If, at 610, control circuitry determines "No," the baseline user action does not match an abnormal behavior model, the process advances to 612. At 612, the behavior analysis engine 302, by control circuitry 404, iterates to next action of the plurality of baseline user actions to determine whether one action of the plurality of baseline user actions matches an abnormal behavior model.

If, at 610, control circuitry determines "Yes," the baseline user action matches an abnormal behavior model, the process advances to 614. At 614, the behavior analysis engine 302, by control circuitry 404, excludes the one action from the plurality of baseline user actions.

Figure 7:
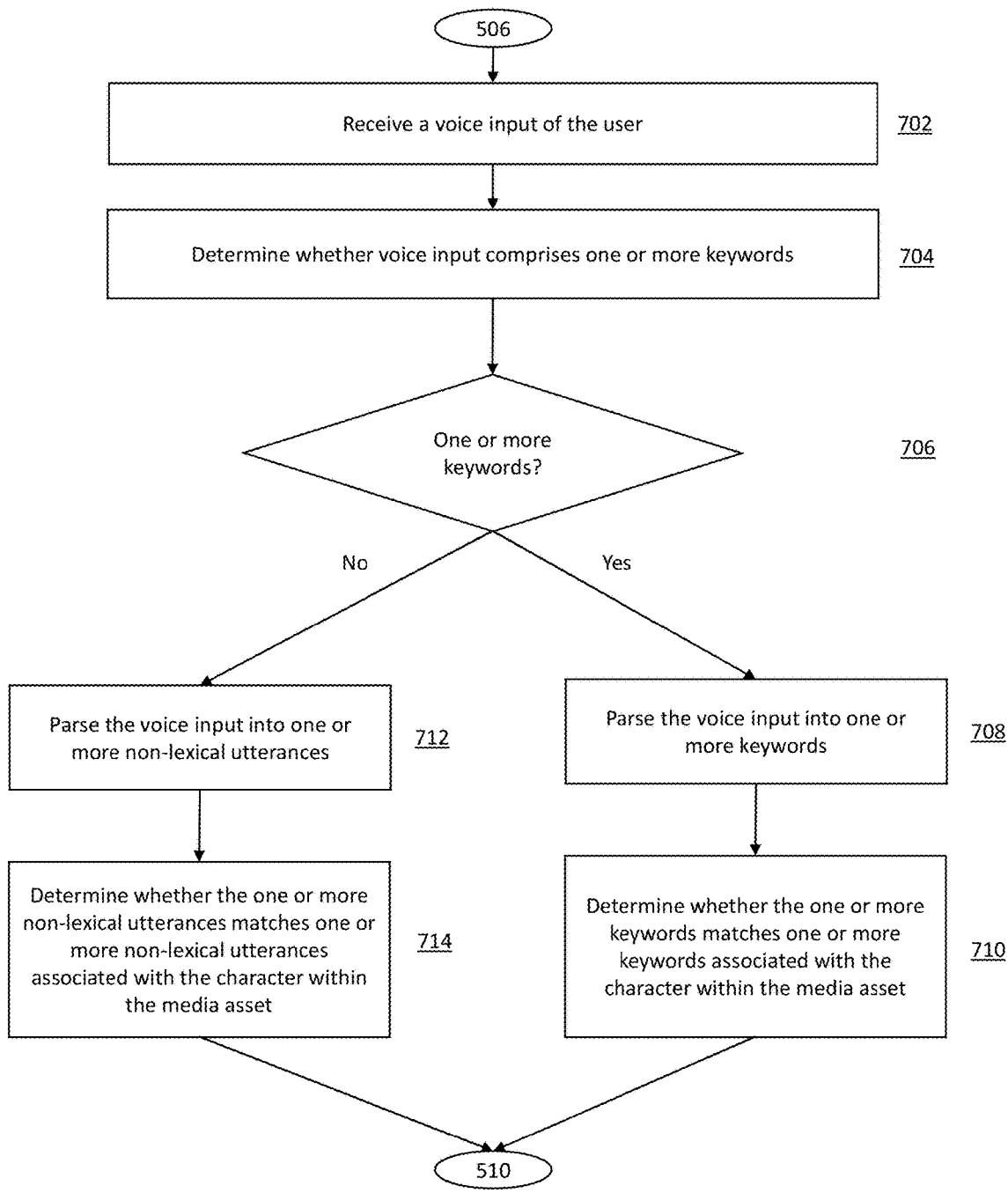
FIG. 7 is an illustrative flowchart of a process for determining whether a user action matches a character action, in accordance with some embodiments of the disclosure.

FIG. 7 is an illustrative flowchart of a process for determining whether a user action matches a character action, in accordance with some embodiments of the disclosure. At 702, the behavior analysis engine 302, by control circuitry 404, receives a voice input of the user. In some embodiments, the behavior analysis engine 302 may receive the voice input of the user from devices 306-312 via the I/O path 406.

At 704, the behavior analysis engine 302, by control circuitry 404, determines whether voice input comprises one or more keywords. In some embodiments, the determining whether voice input comprises one or more keywords requires parsing techniques performed, at least in part, by processing circuitry 408. If at 706, after parsing, the behavior analysis engine 302, by control circuitry 404, determines "No", that there are not one or more keywords, the process advances to 712. At 712, the behavior analysis engine 302, by control circuitry 404, parses the voice input into one or more non-lexical utterances. In some embodiments, the parsing of the voice input into one or more non-lexical utterances is performed, at least in part, by processing circuitry 408.

At 714, the behavior analysis engine 302, by control circuitry 404, determines whether the one or more non-lexical utterances matches one or more non-lexical utterances associated with the character within the media asset.

If, at 706, control circuitry determines "Yes," there are one or more keywords, the process advances to 708. At 708, the behavior analysis engine 302, by control circuitry 404, parses the voice input into one or more keywords. In some embodiments, the parsing of the voice input into one or more keywords is performed, at least in part, by processing circuitry 408.

At 710, the behavior analysis engine 302, by control circuitry 404, determines whether the one or more keywords matches one or more keywords associated with the character within the media asset.

Figure 8:
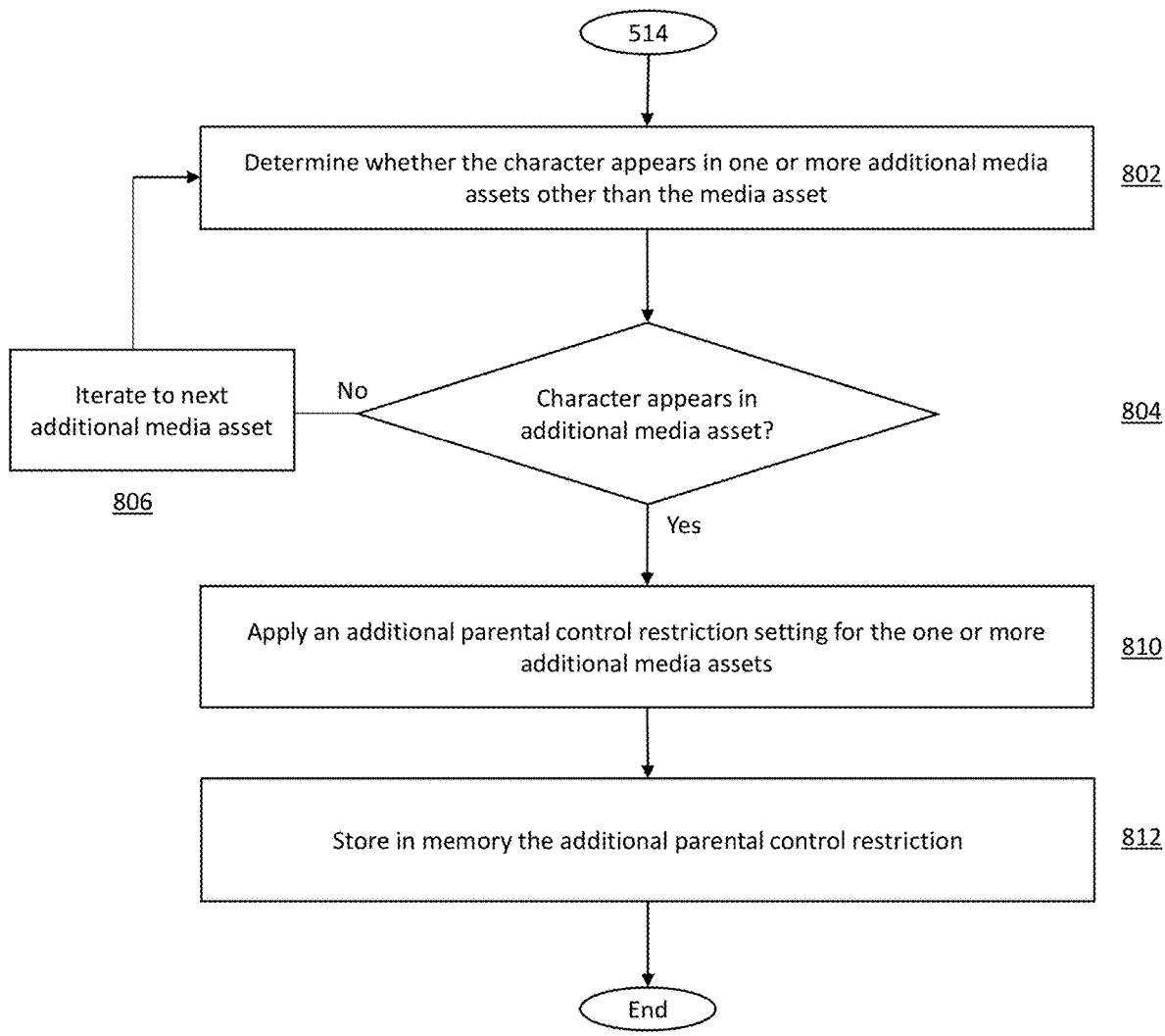
FIG. 8 is an illustrative flowchart of a process for applying an additional parental control restriction setting for additional media assets, in accordance with some embodiments of the disclosure.

FIG. 8 is an illustrative flowchart of a process 800 for applying an additional parental control restriction setting for additional media assets, in accordance with some embodiments of the disclosure. At 802, the behavior analysis engine 302, by control circuitry 404, determines whether the character appears in one or more additional media assets other than the media asset. In some embodiments, the behavior analysis engine 302 may receive data (e.g. metadata of the additional media assets) from the streaming service server 304 via the I/O path 406. If, at 804, control circuitry determines "No," the character does not appear in one or more additional media assets other than the media asset, the process advances to 806. At 806, the behavior analysis engine 302, by control circuitry 404, iterates to next additional media asset of the plurality of additional media assets to determine whether the character appears in the next iterated additional media asset other than the media asset.

If, at 804, control circuitry determines "Yes," the character appears in one or more additional media assets other than the media asset, the process advances to 810. At 810, the behavior analysis engine 302, by control circuitry 404, applies an additional parental control restriction setting for the one or more additional media assets and stores in memory the additional parental control restriction 812. In some embodiments, the behavior analysis applies the additional parental control restriction setting via an instruction to the streaming service server 304 via the I/O path 406. In some embodiments, the behavior analysis stores in memory the additional parental control restriction setting via an instruction to the streaming service server 304 via the I/O path 406.

It is contemplated that some suitable steps or suitable descriptions of FIGS. 5-8 may be used with other suitable embodiment of this disclosure. In addition, some suitable steps and descriptions described in relation to FIGS. 5-8 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 3-4 could be used to perform one or more of the steps in FIGS. 5-8.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method performed by a control circuitry of a computing device for applying behavioral-based parental controls for media assets, the method comprising:
    identifying one or more character actions performed by a first character within a first media asset, wherein each character action of the one or more character actions comprises a respective character behavior type and a respective character behavior characteristic value;
    determining, from a recording of a user, that a user behavior type and a user behavior characteristic value of a user action respectively matches the respective characteristic behavior type and the respective character behavior characteristic value of the one or more character actions of the first character from the first media asset, wherein the user action is made by the user during playback of the media asset;
    in response to determining the match, applying a parental control restriction for restricting consumption of the first media asset and storing the parental control restriction in a memory; and
    automatically applying the parental control restriction applied on the first media asset to a second media asset, wherein the application to the second media asset is based upon a determination that the second media asset includes an appearance of the first character.

2. The method of claim 1, further comprising, determining presence of the first character in the first media asset and in response to determining the presence, identifying the one or more character actions performed by the first character.

3. The method of claim 1, wherein the recording of the user is a video recording.

4. The method of claim 3, further comprising, parsing the video recording into one or more video actions to determine the action performed by the user.

5. The method of claim 1, wherein the parental control restriction for restricting consumption of the first media asset is applied to a scene of the first media asset in which the appearance of the first character is detected.

6. The method of claim 5, further comprising, excluding the scene in the first media asset based on an implementation of the parental control restriction.

7. The method of claim 5, further comprising, applying the parental control restriction for restricting consumption of the first media asset to a scene of the first media asset in which the appearance of the first character is detected, wherein the application of the parental control to the scene includes dubbing a replacement audio for the scene.

8. The method of claim 5, further comprising, applying the parental control restriction for restricting consumption of the first media asset to a scene of the first media asset in which the appearance of the first character is detected, wherein the application of the parental control to the scene includes inserting a replacement scene for the scene of the first media asset in which the appearance of the first character is detected.

9. A system for applying behavioral-based parental controls for media assets, the system comprising:
    at least one processor configured to store parent control restrictions as applied to media assets; and
    control circuitry communicably coupled to the at least one processor, wherein the control circuitry is configured to:
        identify one or more character actions performed by a first character within a first media asset, wherein each character action of the one or more character actions comprises a respective character behavior type and a respective character behavior characteristic value;
        determine based on a recording of a user, that a user behavior type and a user behavior characteristic value of a user action respectively matches the respective characteristic behavior type and the respective character behavior characteristic value of the one or more character actions of the first character from the first media asset, wherein the user action is made by the user during playback of the media asset;
        in response to determining the match, applying, by control circuitry, a parental control restriction for restricting consumption of the first media asset and storing the parental control restriction in a memory; and
        automatically applying the parental control restriction applied on the first media asset to a second media asset, wherein the application to the second media asset is based upon a determination that the second media asset includes an appearance of the first character.

10. The system of claim 9, wherein the control circuitry is further configured to determine presence of the first character in the first media asset and in response to determining the presence, identifying the one or more character actions performed by the first character.

11. The system of claim 9, wherein the recording of the user is a video recording.

12. The system of claim 11, wherein the control circuitry is further configured to parse the video recording into one or more video actions to determine the action performed by the user.

13. The system of claim 9, wherein the parental control restriction for restricting consumption of the first media asset is applied by the control circuitry to a scene of the first media asset in which the appearance of the first character is detected.

14. The system of claim 13, wherein the control circuitry is further configured to exclude the scene in the first media asset based on an implementation of the parental control restriction.

15. The system of claim 13, wherein the control circuitry is further configured to apply the parental control restriction for restricting consumption of the first media asset to a scene of the first media asset in which the appearance of the first character is detected, wherein the application of the parental control to the scene includes dubbing a replacement audio for the scene.

16. The system of claim 13, wherein the control circuitry is further configured to apply the parental control restriction for restricting consumption of the first media asset to a scene of the first media asset in which the appearance of the first character is detected, wherein the application of the parental control to the scene includes inserting a replacement scene for the scene of the first media asset in which the appearance of the first character is detected.

* * * * *